United States Patent
Jelak et al.

(10) Patent No.: US 9,608,362 B2
(45) Date of Patent: Mar. 28, 2017

(54) MAT SEAL FOR AN ELECTRIC CONNECTOR AND MOLDING TOOL FOR INJECTION MOLDING OF A MAT SEAL

(71) Applicant: YAZAKI EUROPE, LTD., Hertfordshire (GB)

(72) Inventors: Josip Jelak, Krizevci (HR); Vedran Mahovic, Samobor (HR); Tvrtko Rebic, Samobor (HR); Michael Wiese, Ennepetal (DE)

(73) Assignee: YAZAKI EUROPE, LTD., Hertfordshire (GB)

( * ) Notice: Subject to any disclaimer, the term of this patent is extended or adjusted under 35 U.S.C. 154(b) by 0 days.

(21) Appl. No.: 14/632,096

(22) Filed: Feb. 26, 2015

(65) Prior Publication Data
US 2015/0255913 A1   Sep. 10, 2015

(30) Foreign Application Priority Data
Mar. 5, 2014   (EP) .................................... 14157866

(51) Int. Cl.
| B29C 47/00 | (2006.01) |
| H01R 13/52 | (2006.01) |
| H01R 43/00 | (2006.01) |
| B29C 45/03 | (2006.01) |
| B29C 45/26 | (2006.01) |

(Continued)

(52) U.S. Cl.
CPC ........... H01R 13/521 (2013.01); B29C 45/03 (2013.01); B29C 45/2628 (2013.01); H01R 13/5208 (2013.01); H01R 43/005 (2013.01); B29L 2031/26 (2013.01); H01R 13/506 (2013.01); H01R 13/5202 (2013.01); H01R 2201/26 (2013.01)

(58) Field of Classification Search
CPC  H01R 13/521; H01R 13/5208; H01R 43/005; H01R 13/506; H01R 13/5202; H01R 2201/26; B29C 45/03
USPC .................................. 439/587, 271, 279, 275
See application file for complete search history.

(56) References Cited

U.S. PATENT DOCUMENTS

| 4,664,461 A | 5/1987 | Schubert et al. |
| 5,074,771 A | 12/1991 | Thakrar et al. |

(Continued)

FOREIGN PATENT DOCUMENTS

| JP | 2011-507177 A | 3/2011 |
| WO | 2004/064202 A1 | 7/2004 |

(Continued)

OTHER PUBLICATIONS

Communication dated Nov. 18, 2014 from the European Patent Office in counterpart application No. 14157866.6.

*Primary Examiner* — Abdullah Riyami
*Assistant Examiner* — Nelson R Burgos-Guntin
(74) *Attorney, Agent, or Firm* — Sughrue Mion, PLLC

(57) ABSTRACT

A mat seal for an electrical connector, including: a front face, a rear face opposite to the front face, and a plurality of passageways each adapted to receive a cable to be inserted through the passageway, at least one cavity in at least one of the front face and the rear face, wherein at least two first passageways of the plurality of passageways open into one of the at least one cavity, and wherein at least one second passageway of the plurality of passageways opening into the front face and the rear face of the mat seal.

8 Claims, 4 Drawing Sheets

(51) Int. Cl.
*H01R 13/506* (2006.01)
*B29L 31/26* (2006.01)

(56) References Cited

U.S. PATENT DOCUMENTS

| | | | | |
|---|---|---|---|---|
| 5,145,410 A * | 9/1992 | Maejima | H01R 13/5208 | 439/274 |
| 5,766,039 A * | 6/1998 | Abe | H01R 13/5208 | 439/587 |
| 5,823,811 A | 10/1998 | Blanchfield et al. | | |
| 5,952,016 A * | 9/1999 | Gellert | B29C 45/2735 | 425/190 |
| 6,071,146 A * | 6/2000 | Horner | H01R 13/5208 | 439/275 |
| 6,235,231 B1 * | 5/2001 | Martin | B29C 45/2628 | 264/328.1 |
| 6,739,908 B2 * | 5/2004 | Hamai | H01R 13/5208 | 439/275 |
| 7,371,115 B1 * | 5/2008 | Hsieh | H01R 13/5208 | 439/271 |
| 8,337,244 B2 * | 12/2012 | Sawamura | H01R 13/5208 | 439/271 |
| 8,568,168 B2 * | 10/2013 | Han | B29C 45/2628 | 439/587 |
| 8,647,132 B2 * | 2/2014 | Kuroda | H01R 13/5208 | 439/271 |
| D730,416 S * | 5/2015 | Jacovich | D15/135 | |
| 9,128,410 B2 * | 9/2015 | Suzuki | H01R 13/5221 | |
| 2002/0141905 A1 * | 10/2002 | Sha | B01L 3/5025 | 422/553 |
| 2003/0039717 A1 * | 2/2003 | Hwang | B29C 45/02 | 425/556 |
| 2003/0181101 A1 * | 9/2003 | Soriano | H01R 43/005 | 439/587 |
| 2004/0029442 A1 * | 2/2004 | Oka | H01R 13/5208 | 439/587 |
| 2004/0178537 A1 * | 9/2004 | Polosky | B81C 99/0085 | 264/328.16 |
| 2004/0266261 A1 * | 12/2004 | Miyazaki | H01R 9/032 | 439/587 |
| 2006/0189191 A1 | 8/2006 | Drescher et al. | | |
| 2009/0305569 A1 * | 12/2009 | Chazottes | H01R 13/5205 | 439/655 |
| 2010/0221380 A1 * | 9/2010 | Cullison | B29C 45/4421 | 425/577 |
| 2010/0273353 A1 * | 10/2010 | Yahya | H01R 13/5208 | 439/587 |
| 2011/0300731 A1 * | 12/2011 | Nakamura | H01R 13/504 | 439/271 |
| 2013/0029004 A1 * | 1/2013 | Looije | B29C 45/40 | 425/556 |
| 2014/0206122 A1 * | 7/2014 | Fernandez | H01L 21/565 | 438/48 |
| 2014/0378006 A1 * | 12/2014 | Pade | H01R 13/436 | 439/752 |
| 2015/0004812 A1 * | 1/2015 | Hara | H01R 12/714 | 439/76.1 |
| 2015/0018248 A1 * | 1/2015 | Kim | B29C 45/1671 | 506/14 |
| 2015/0072542 A1 * | 3/2015 | Hara | H01R 12/714 | 439/74 |
| 2015/0255913 A1 * | 9/2015 | Jelak | B29C 45/03 | 439/587 |
| 2016/0020548 A1 * | 1/2016 | Takamura | H01R 13/5202 | 439/587 |
| 2016/0100622 A1 * | 4/2016 | Budek | A23P 1/105 | 425/195 |

FOREIGN PATENT DOCUMENTS

| | | |
|---|---|---|
| WO | 2009/075850 A2 | 6/2009 |
| WO | 2013/135419 A1 | 9/2013 |

* cited by examiner

MAT SEAL FOR AN ELECTRIC CONNECTOR AND MOLDING TOOL FOR INJECTION MOLDING OF A MAT SEAL

BACKGROUND OF THE INVENTION

Field of the Invention

The invention refers to a mat seal for an electrical connector having a front face, a rear face opposite to the front face and a plurality of passageways each adapted to receive a cable to be inserted through said passageway.

Background

Such a mat seal is, for instance, known from U.S. Pat. No. 6,739,908 B2 disclosing a connector housing including a plurality of terminal receiving chambers, a mat seal mounted to an end surface of the connector housing and a mat seal holder for holding the mat seal wherein the mat seal is disposed between the connector housing and the mat seal holder. The mat seal holder has through holes which are in alignment with the plurality of passageways of the mat seal. Furthermore, the terminal receiving chambers of the connector housing are also aligned with the plurality of passageways of the mat seal. In order to mount terminals into the terminal receiving chambers of the connector housing the terminals first are connected, for example by a crimping process, to a cable and the so connected terminal with cable is inserted through the through holes of the mat seal holder and through the passageways of the mat seal into the terminal receiving chambers of the connector housing. One general object of a waterproof electrical connector is to have a good sealing ability of the mat seal, in particular around the cables which are accommodated within the passageways of the mat seal when the terminals are completely inserted into the terminal receiving chambers of the connector housing. Also it has to be ensured that the insertion force to insert the terminals and the cables through the mat seal is low with a low risk of damaging both the mat seal and the wires, in particular the connection between the cables and the terminals, during the insertion process.

Another mat seal is described in WO 2009/075850 A1 disclosing a mat seal having a thick portion and a thin portion. The mat seal is provided with broad passageways within the thick portion and with narrow passageways within the thin portion. This mat seal is, therefore, suitable for electrical connectors accommodating terminals and cables with different sizes.

A trend, in particular in the automotive industry, is to push weight and cost reduction for wire harnesses. Car manufactures are focusing to use smaller cables. Smaller cables necessitate mat seals having passageways with smaller diameters in order to guaranty sufficient sealing abilities. However, smaller cross section diameters increase the risk of cables being buckled during insertion through the mat seal. In addition, due to the very small diameters of the cables there is a risk that during the insertion of the terminal and the cables through the mat seal the cables are damaged or torn off from the terminal.

Using smaller terminals and smaller cables makes it possible to reduce the distance between adjacent terminals. This may results in difficulties when manufacturing the mat seals. The passageways are typically produced by injection molding tools having cores wherein the cores are forming the passageways through the mat seal. The thinner the passageways have to be formed the thinner the cores have to be. This results in a high risk of the cores being broken during the manufacturing process, for example, during the retraction of the cores out of the molded mat seal.

SUMMARY OF THE INVENTION

The object of the present invention is to provide a mat seal and a molding tool for molding a mat seal avoiding the aforementioned drawbacks.

Thus, according to the invention, a mat seal for an electrical connector is provided having a front face, a rear face opposite to the front face, and a plurality of passageways each adapted to receive a cable to be inserted through said passageway. The mat seal further comprises at least one cavity in one of the front face and the rear face wherein at least two first passageways of the plurality of passageways open into one of said at least one cavity. Said plurality of passageways further comprises at least one second passageway opening into the front face and the rear face of the mat seal. The second passageways do not open into a cavity of the front face or the rear face.

Accordingly, the mat seal has a cavity in the front face and/or in the rear face so that the first passageways do not have to reach through the entire thickness of the mat seal, i.e. the distance between the front face and the rear face. The first passageways only reach through the mat seal between a ground of one of the cavities and one of the faces of the mat seal or the ground of the cavity in the other face of the mat seal. Hence, the first passageways are shorter in longitudinal direction than the entire thickness of the mat seal. This reduces the friction forces onto the cables while inserting the cables into the first passageways.

The first passageways may have a constriction with a circular cross section having a diameter of maximal 0.75 mm, in particular of maximal 0.50 mm. This enables the mat seal to be used for 0.13 sqm wires having an outer diameter of approximately 1 mm.

Due to the fact that at least two first passageways open into one cavity the design enables the use of molding tools for manufacturing the mat seal having cores of higher stiffness. There might be one tool element, such as an insert, for forming the cavity and cores for forming the first passageways. The cores for forming the passageways do not have to reach into a molding cavity as deep as if no cavities would be provided, so that the cores have a higher stability against lateral forces.

In particular, each first passageway extends along a longitudinal axis and each first passageway has a maximal diameter which is smaller than the minimal radial extension of the cavity. Therefore, it is ensured that no friction force is applied from the mat seal to the cable in the longitudinal region of the cavity.

In a preferred embodiment the first passageways open into one cavity in the front face and into one cavity in the rear face. It is also possible that several cavities are formed into the front face and several cavities are formed into the rear face wherein into each of the cavities more than one first passageway opens.

Preferably, the minimal diameter of the at least two first passageways is smaller than the minimal diameter of the at least one second passageway. Hence, the mat seal can be used for cables of different diameters. The first passageways accommodates cables with smaller diameter and the second passageways accommodates cables with bigger diameter.

In an embodiment of the mat seal the mat seal comprises two or more first passageways and two or more second passageways. The distance between two adjacent first passageways is smaller than the distance between two adjacent second passageways.

The invention further refers to a molding tool for injection molding of a mat seal for an electric connector, comprising a first mold with a first cavity and a second mold with a second cavity, wherein said first cavity and said second cavity together form a mold cavity for forming the mat seal. Such molding tools are well known in the prior art.

The mold tool further comprises at least one insert with a plurality of receiving chambers, each receiving chamber receives a core reaching into the mold cavity for forming a first passageway through the mat seal. Alternatively, the insert and the cores can be made integrally in one piece.

At least one insert projects into the mold cavity for forming a cavity in a face of the mat seal.

When adapting the design of a mat seal such that the mat seal can be used for thinner cables the passageways through the mat seal have to be smaller in diameter. Especially, if standard designs of a mat seal shall be used further the thickness of the mat seal does not change. The same occurs if the mat seal shall be used for thin cables and for standard thicker cables as typically used. In order to form passageways for thinner cables through the mat seal very thin cores would have to be used which are fragile in regard to forces in a lateral direction, i.e. in a direction transversely to a longitudinal direction of the cores.

In order to increase the stiffness of the cores the inserts are used which have a bigger diameter or a bigger extension in a radial direction. So these inserts are a supports for the cores within the receiving chambers. The cores project out of the receiving chambers into the mold cavity. The length of the projecting portion of the cores is less than it would be if no insert would be used so that the cores have a higher stability against lateral forces without changing the diameter of the cores.

According to an embodiment of the molding tool at least one pair of inserts is provided, each pair of inserts comprises a first insert arranged in the first mold and a second insert arrange in the second mold. Each pair of inserts receives at least one pair of said cores, each pair of said cores comprising one first core received in the first insert and one second core received in the second insert. The first core and the second core of each pair of cores abut each other within the mold cavity for commonly forming a first passageway of the mat seal. Therefore, none of the cores reaches through the entire mat seal. Two cores are used to form one mat seal so that the required length of each core reaching into the mold cavity is further reduced.

The molding tool may further comprise at least one insertless core reaching into the mold cavity for forming a second passageway through the mat seal wherein the insertless core is received in a receiving chamber of the molding tool. The insertless cores are not received in a receiving chamber of an insert. The insertless cores are used to form second passageways typically of a greater diameter than the first passageways.

Hence, the minimal diameter of said cores received in said at least one insert is smaller than the minimal diameter of said at least one insertless core.

In order to increase the packaging of the passageways the molding tool may comprise two or more cores received in said at least one insert and two or more insertless cores. The distance between two adjacent cores received in said at least one insert is smaller than the distance between two adjacent insertless cores.

Each of said cores has a projecting portion projecting out of the respective receiving chamber into the mold cavity.

The projecting portion of said cores received in said at least one insert have a restriction with a circular cross section having a diameter of maximal 0.75 mm, in particular of maximal 0.50 mm.

BRIEF DESCRIPTION OF THE DRAWINGS

A preferred embodiment is described, by way of example, in the following description and the accompanying drawings.

DETAILED DESCRIPTION OF THE INVENTION

Figure 1:
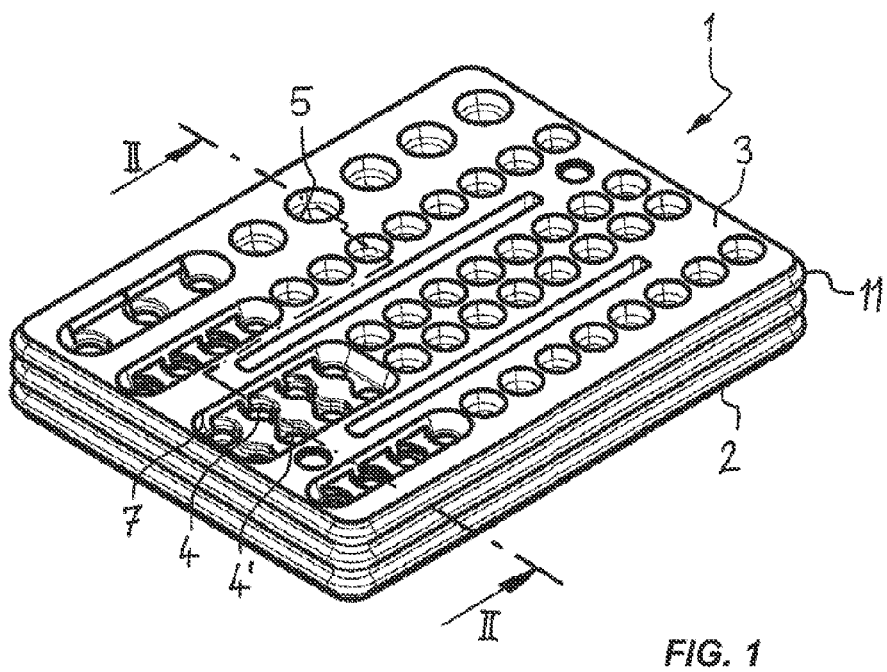
FIG. 1 is a perspective view of a mat seal.
Figure 2:
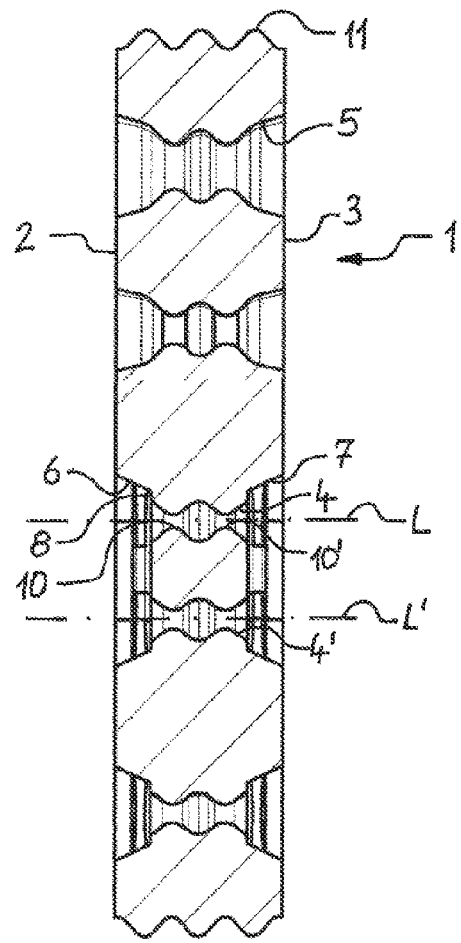
FIG. 2 is a sectional view along the section line II-II according to FIG. 1.

FIGS. 1 and 2 show a mat seal in different views and are described together.

The mat seal 1 has a front face 2 and a rear face 3 wherein the front face 2 and the rear face 3 are arranged parallel to each other. The thickness of the mat seal 1 is defined by the distance between the front face 2 and the rear face 3. The mat seal has a circumference with three sealing beads 11. The mat seal 1 is designed for being held between a housing of a connector and a mat seal holder. The front face 2 is intended to be in contact with the housing of the connector and the rear face 3 is intended to be in contact to the mat seal holder. The sealing beads 11 are held in sealing contact to the housing or the mat seal holder.

The mat seal 1 is penetrated by a plurality of first passageways 4 and second passageways 5. The passageways 4, 5 are orientated along respective longitudinal axes L, L' wherein all longitudinal axes L, L' of all passageways 4, 5 are arranged parallel to each other and perpendicular to the front face 2 and the rear face 3.

In the following, two first passageways 4, 4' are described representing all first passageways 4, 4'. The first passageways 4, 4' open into one common cavity 6 in the front face 2 and into one common cavity 7 in the rear face 3. The first passageways 4, 4', hence, have a shorter length in longitudinal direction than the thickness of the mat seal 1. In other words, the distance between the front face 2 and the rear face 3 is bigger than the length of the first passageways 4, 4'. The first passageways 4, 4' reach from a ground 8 of the cavity 6 of the front face 2 to a ground 9 of the cavity 7 of the rear face 3.

Further, the cavities 6, 7 do have a greater extend lateral to the longitudinal axes L, L' than the first passageways 4, 4'. The greatest diameter of the first passageways 4, 4' is smaller than the smallest lateral extension of the cavities 6, 7 perpendicular to the longitudinal axes L, L'. Thus, when a terminal with a connected cable is pushed through one of the first passageways 4, 4' neither the terminal nor the cable comes into contact with the mat seal 1 in the region of the cavities 6, 7. Further, the length of the first passageways 4, 4' is less than the thickness of the mat seal 1. Both provides for a reduced friction force which acts from the mat seal 1 to the terminal or the cable.

Compared to this, the second passageways 5 do not open into a cavity but directly into the front face 2 and the rear face 3 so that the friction forces are higher than the friction forces within the first passageways 4. In addition, the minimal diameter of the first passageways 4 is smaller than the minimal diameter of the second passageways 5 so that the second passageways 5 are suitable for bigger cables than the first passageways 4.

Figure 3:
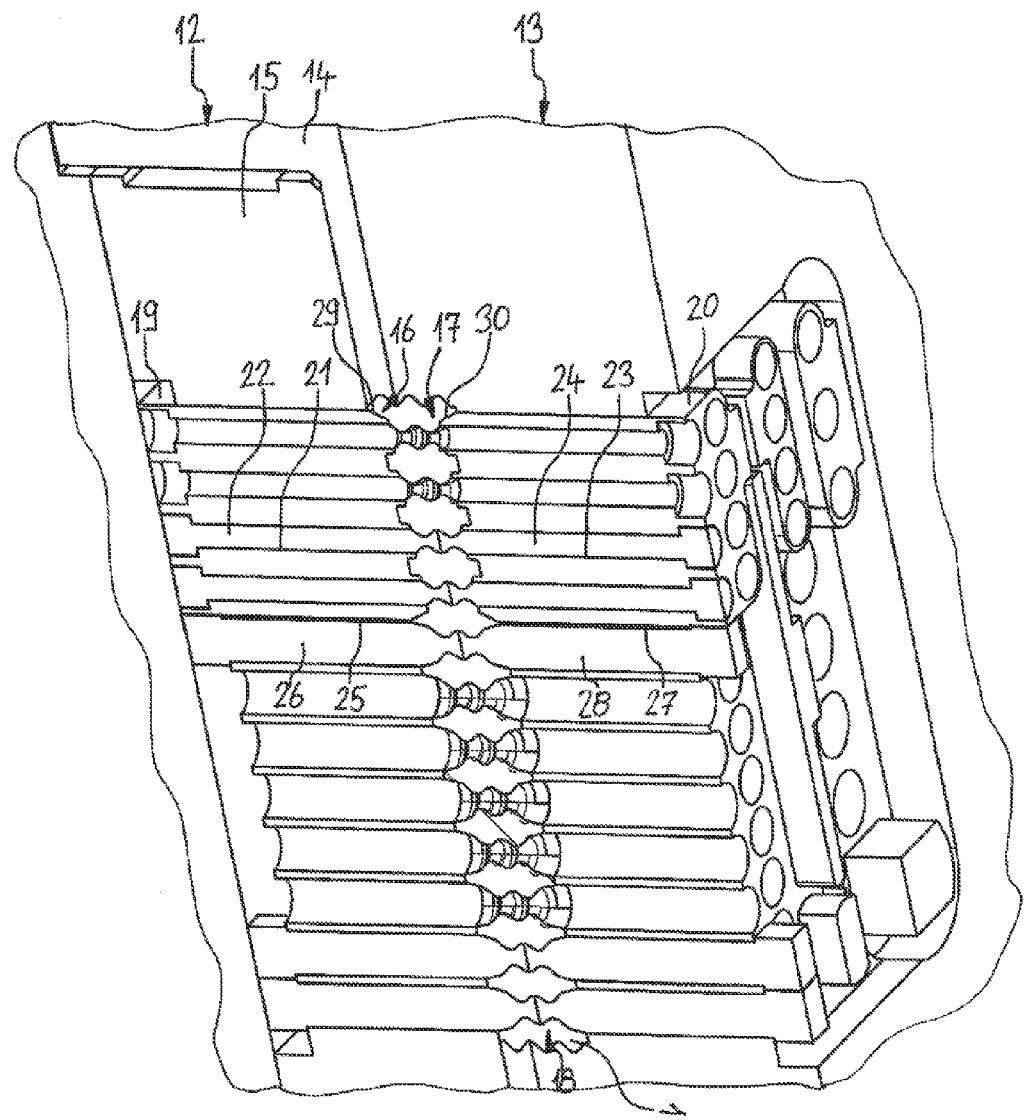
FIG. 3 is a perspective longitudinal sectional view of a molding tool for molding a mat seal.
Figure 4:
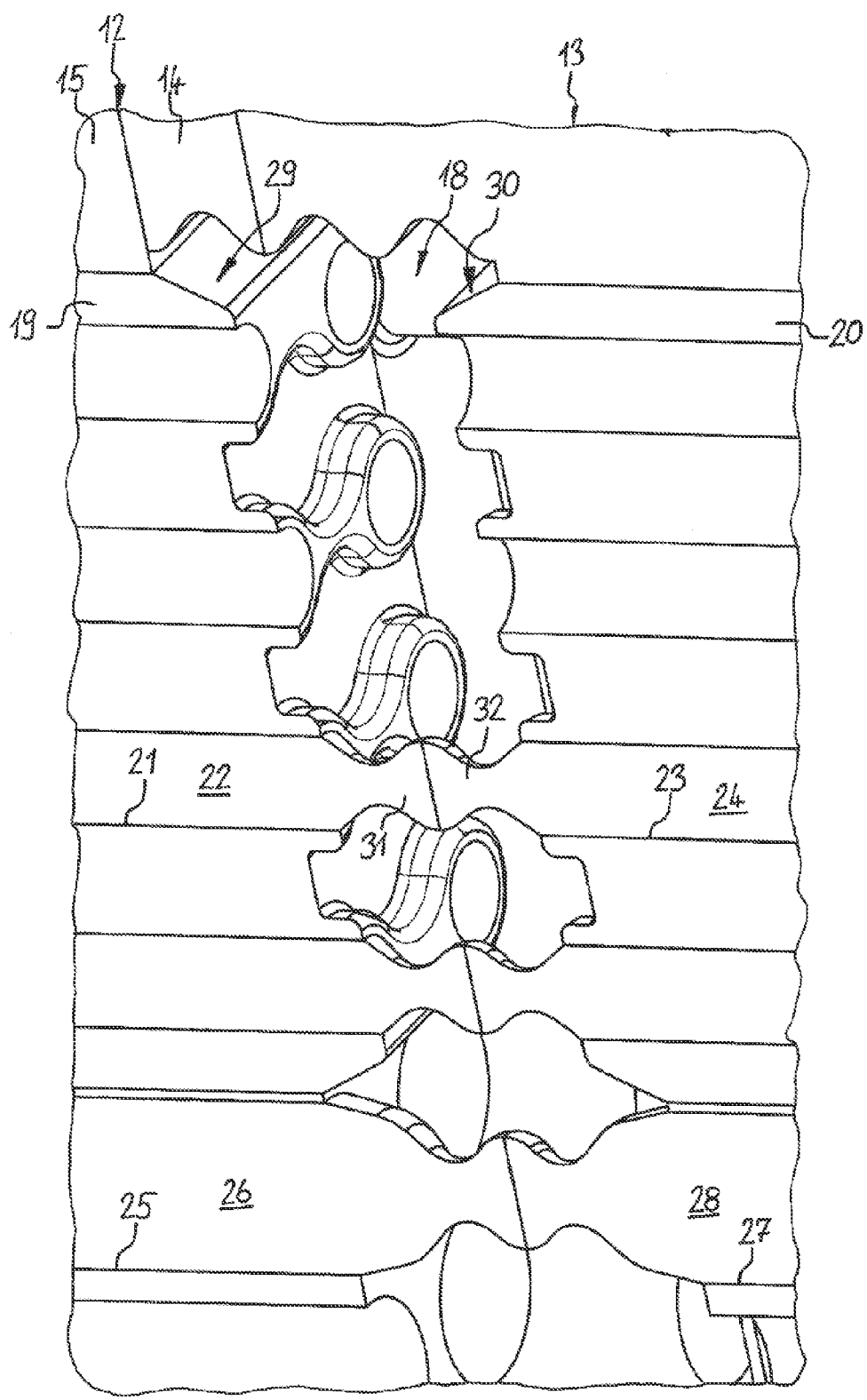
FIG. 4 is an enlarged view of the molding cavity of the molding tool according to FIG. 3.

FIGS. 3 and 4 depict a molding tool for molding a mat seal according to FIGS. 1 and 2. The molding tool comprises a first mold 12 and a second mold 13. The first mold is a combination of a first mold module 14 and a second mold module 15 together forming a first cavity 16. The second mold 13 forms a second cavity 17. The first cavity 16 and the second cavity 17 together form a mold cavity 18 in the form of the mat seal according to FIGS. 1 and 2. The mat seal 1 is also shown in FIG. 3. In FIG. 4 the mold cavity 18 is shown without mat seal. The first mold 12 and the second mold 13 can be opened and closed. In FIGS. 3 and 4 the molds 12, 13 are shown in the closed position. For opening the molds 12, 13 are moved apart from each other parallel to the longitudinal axes L, L'.

The first mold 12 further comprises several first inserts 19, one of which is described representing all first inserts 19. The second mold 13 comprises several second inserts 20, one of which is described representing the other second inserts.

Figure 5:
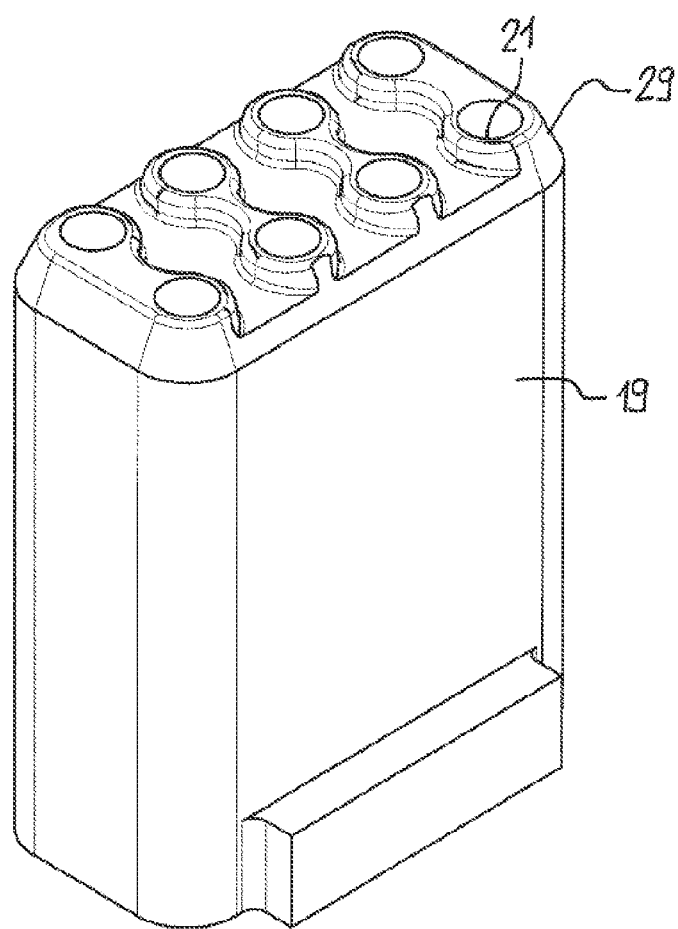
FIG. 5 is a perspective view of an insert for a molding tool according to FIG. 3
Figure 6:
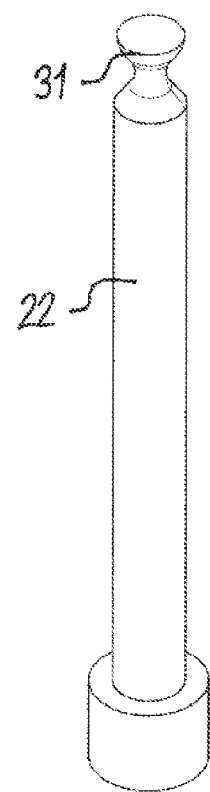
FIG. 6 is a perspective view of a core inserted into the insert according to FIG. 5.

The first insert 19 and the second insert 20 each have an insert head 29, 30, which can also be seen in FIG. 5, showing the first insert 19. The insert heads 29, 30 project into the mold cavity 18 for forming the cavities in the front face 2 and the rear face 3 respectively of the mat seal according to FIGS. 1 and 2.

The first insert 19 has receiving chambers 21 extending along the longitudinal axis L for forming the first passageways 4. The receiving chambers 21 receive first cores 22, one of which is shown in FIG. 3. In the same manner the second insert 20 has receiving chambers 23 receiving second cores 24. The first cores 22 and the second cores 24 each have a projecting portion 31, 32 aligned to the longitudinal axis L and projecting out of their respective receiving chamber 21, 23 for forming the first passageways 4. For forming each of the first passageways for a pair of inserts, i.e. the one first insert 19 and one second insert 20 are provided. Further, a pair of receiving chambers 21, 23 are provided, one receiving chamber 21 in the first insert 19 and one receiving chamber 23 in the second insert 20, wherein the receiving chambers 21, 23 of the pair of receiving chambers are aligned along one longitudinal axis L. The receiving chambers 21, 23 receive cores, i.e. a first core 22 in the receiving chamber 21 of the first insert 19 and a second core 24 in the receiving chamber 23 of the second insert 20. Within the mold cavity 18 the first core 22 and the second core 24 abut each other.

For forming the second passageways 5 the first mold 12, namely the second mold module 15, and the second mold 13 are provided with receiving chambers 25, 27 wherein the receiving chambers 25, 27 are directly provided within the first mold 12 and the second mold 13 respectively without any inserts. The receiving chambers 25, 27 receive cores 26, 28, each having a projecting portion 33, 34 which project out of their respective receiving chamber 25, 27 into the mold cavity 18. A pair of cores 26, 28 are aligned along a longitudinal axis and abut each other within the mold cavity 18 in order to form a second passageway 5 of the mat seal 1.

Especially, as can be seen from FIG. 4, the projecting portions 31, 32 of the cores 22, 24 for forming the first passageway 4 are shorter and project over a smaller distance into the mold cavity 18 as the projecting portions 33, 34 of the cores 26, 28 forming the second passageways 5. The cores 22, 24 for forming the first passageways 4 are supported in a radial direction by the inserts 19, 20 so that these cores 22, 24 have a increased radial stability. Therefore, the cores 22, 24 can have a smaller diameter than the cores 26, 28 for forming the second passageways 5.

The invention claimed is:

1. A molding tool for injection molding of a mat seal (1) for an electric connector, comprising:
    a first mold with a first cavity,
    a second mold with a second cavity,
    a mold cavity formed by said first cavity and said second cavity for forming the mat seal, and
    at least one insert with a plurality of receiving chambers, each receiving chamber receives a core reaching into the mold cavity for forming a first passageway through the mat seal,
    wherein said at least one insert projects into the mold cavity for forming a cavity in a face of the mat seal.

2. The molding tool according to claim 1, wherein at least one pair of inserts is provided, each pair of inserts comprises a first insert arranged in the first mold and a second insert arranged in the second mold,
    wherein each pair of inserts receives at least one pair of said cores, each pair of said cores comprising one first core received in the first insert and one second core received in the second insert, and
    wherein the first core and the second core of each pair of cores abut each other within the mold cavity for commonly forming a first passageway of the mat seal.

3. The molding tool according to claim 1, wherein the molding tool further comprises at least one insertless core reaching into the mold cavity for forming a second passageway through the mat seal wherein the insertless core is received in a receiving chamber of the molding tool.

4. The molding tool according to claim 3, wherein the minimal diameter of said cores received in said at least one insert is smaller than the minimal diameter of said at least one insertless core.

5. The molding tool according to claim 3, wherein the molding tool comprises two or more cores received in said at least one insert and two or more insertless cores, and
    wherein the distance between adjacent cores received in said at least one insert is smaller than the distance between adjacent insertless cores.

6. The molding tool according to claim 1, wherein each of said cores has a projecting portion projecting out of the respective receiving chamber into the mold cavity.

7. The molding tool according to claim 6, wherein the projecting portion of said cores received in said at least one insert have a constriction with a circular cross section having a maximum diameter of 0.75 mm.

8. The molding tool according to claim 6, wherein the projecting portion of said cores received in said at least one insert have a constriction with a circular cross section having a maximum diameter of 0.50 mm.

* * * * *